(12) United States Patent
Comer et al.

(10) Patent No.: US 11,673,046 B2
(45) Date of Patent: Jun. 13, 2023

(54) SYSTEM AND METHOD OF UTILIZING A MULTIPLAYER GAME

(71) Applicant: Dell Products L.P., Round Rock, TX (US)

(72) Inventors: Ryan Nicholas Comer, Pflugerville, TX (US); Marc Randall Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 17/146,721

(22) Filed: Jan. 12, 2021

(65) Prior Publication Data

US 2022/0219082 A1 Jul. 14, 2022

(51) Int. Cl.
*A63F 13/00* (2014.01)
*A63F 13/52* (2014.01)
*G06T 7/11* (2017.01)
*G06T 7/90* (2017.01)
*G06T 1/20* (2006.01)
*H04L 67/131* (2022.01)

(52) U.S. Cl.
CPC ............... *A63F 13/52* (2014.09); *G06T 1/20* (2013.01); *G06T 7/11* (2017.01); *G06T 7/90* (2017.01); *G06T 2200/24* (2013.01); *H04L 67/131* (2022.05)

(58) Field of Classification Search
CPC .......... A63F 13/25; A63F 13/86; A63F 13/00; A63F 13/45; A63F 13/847; A63F 13/55
See application file for complete search history.

(56) References Cited

U.S. PATENT DOCUMENTS

2012/0306904 A1* 12/2012 Francois ................ A63F 13/52
345/589
2014/0267031 A1* 9/2014 Huebner ............... G06F 3/0346
345/158

\* cited by examiner

*Primary Examiner* — David L Lewis
*Assistant Examiner* — Eric M Thomas
(74) *Attorney, Agent, or Firm* — McDermott Will & Emery LLP

(57) ABSTRACT

In one or more embodiments, one or more systems, one or more methods, and/or one or more processes may determine first multiple subsegments of an image segment of first image segments associated with image coordinates; determine first multiple average color values respectively associated with the first multiple subsegments; receive user input from an information handling system (IHS) of the multiple information handling systems (IHSs); receive a second image frame of the game based at least on the user input; determine second multiple subsegments of an image segment of second image segments of the second image frame associated with the image coordinates; determine second multiple average color values respectively associated with the second multiple subsegments; determine that a comparison of the first multiple average color values with second multiple average color values meets or exceeds a threshold; and associate the image coordinates with the IHS of the multiple IHSs.

20 Claims, 8 Drawing Sheets

SYSTEM AND METHOD OF UTILIZING A MULTIPLAYER GAME

BACKGROUND

Field of the Disclosure

This disclosure relates generally to information handling systems and more particularly to utilizing a multiplayer game with multiple displays respectively associated with multiple information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive a first image frame of a game, in which the first image frame includes multiple first image segments respectively associated with multiple image coordinates; may provide the first image frame to multiple information handling systems coupled to a network respectively associated with multiple users of the game; may determine first multiple subsegments of an image segment of the first image segments associated with image coordinates of multiple image coordinates; may determine first multiple average color values respectively associated with the first multiple subsegments; may receive user input from an information handling system of the multiple information handling systems; may receive a second image frame of the game, in which the second image frame is based at least on the user input and in which the second image frame includes multiple second image segments respectively associated with the multiple image coordinates; may determine second multiple subsegments of an image segment of the second image segments associated with the image coordinates of the multiple image coordinates; may determine second multiple average color values respectively associated with the second multiple subsegments; may determine a comparison of the first multiple average color values with second multiple average color values; may determine that the comparison meets or exceeds a threshold; and in response to determining that the comparison meets or exceeds the threshold, may associate the image coordinates with the information handling system of the multiple information handling systems associated with the user input.

In one or more embodiments, receiving the first image frame may include receiving the first image frame from at least one of a processor of a server information handling system and a graphics processing unit of the server information handling system. In one or more embodiments, receiving the second image frame may include receiving the second image frame from the at least one of the processor of the server information handling system and the graphics processing unit of the server information handling system. In one or more embodiments, the one or more systems, the one or more methods, and/or the one or more processes may further: render, by the at least one of the processor of the server information handling system and the graphics processing unit of the server information handling system, the first image frame; and render, by the at least one of the processor of the server information handling system and the graphics processing unit of the server information handling system, the second image frame.

In one or more embodiments, the multiple information handling systems may include the server information handling system. In one or more embodiments, receiving the first image frame may include receiving the first image frame from a gaming console. For example, receiving the first image frame from the gaming console may include receiving the first image frame from the gaming console via a video interface. For instance, the video interface may include at least one of a high-definition multimedia interface (HDMI), a digital visual interface (DVI), a DisplayPort interface, a video graphics array (VGA) interface, and a universal serial bus (USB) interface, among others. In one or more embodiments, receiving the second image frame may include receiving the second image frame from the gaming console. For example, receiving the second image frame from the gaming console includes receiving the second image frame from the gaming console via the video interface.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
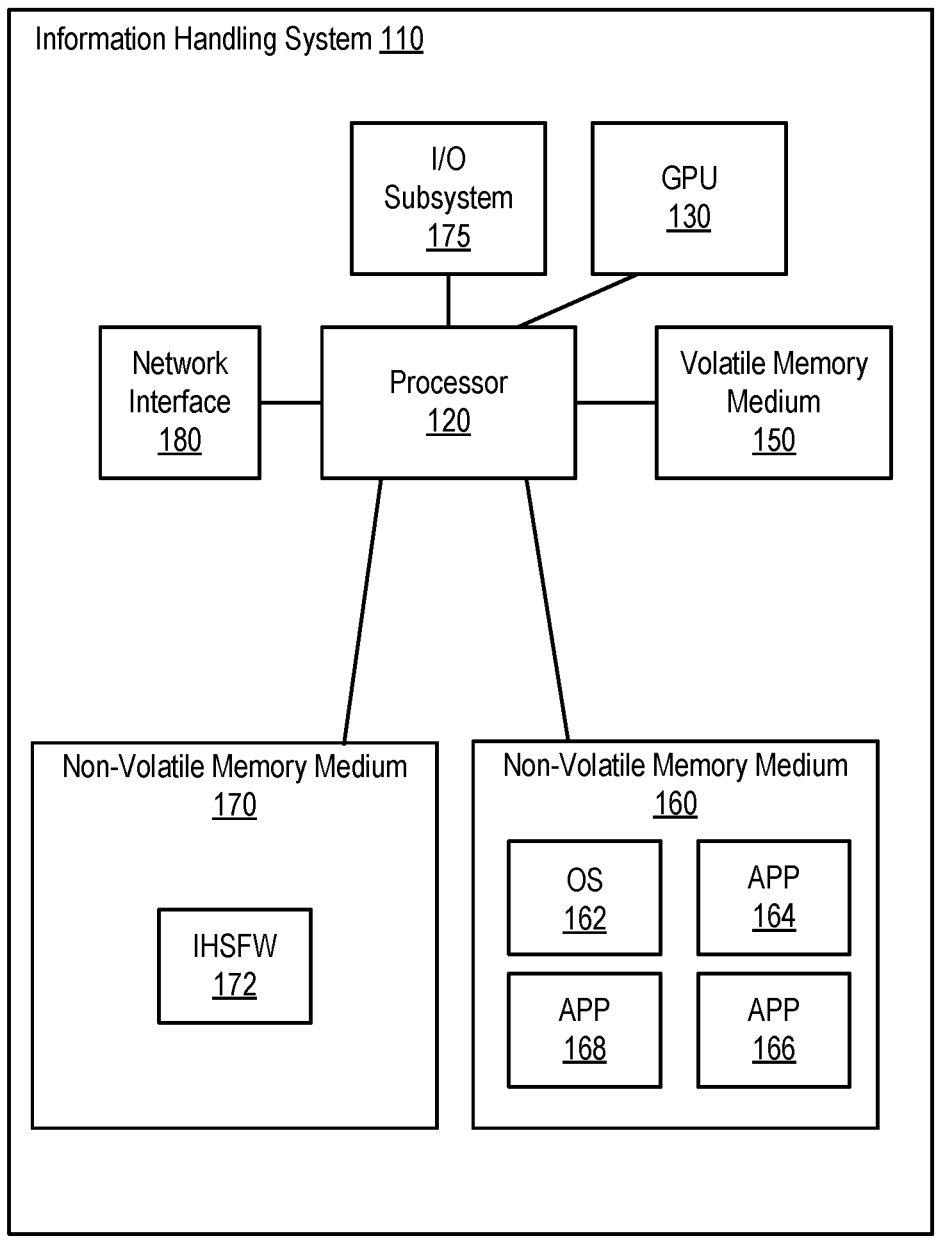
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a multiplayer video game may permit multiple people (e.g., players) to play on an information handling system. In one example, a display associated with the information handling system may present each view of each person (e.g., player) on the display via a split-screen format. In another example, multiple people may play a video game via a network. For instance, the multiple people may utilize multiple information handling systems coupled to the network to play the video game. As an example, each of the multiple people may utilize a respective information handling system of the multiple information handling systems coupled to the network. In one or more embodiments, images of the video game may be presented to each of the multiple people utilizing his or her respective information handling system. In one example, when the multiple people view the images, a first person of the multiple people may be able to view what a second person of the multiple people is viewing. For instance, all of the multiple people may view a same image. In another example, a first person of the multiple people may be able to view what a second person of the multiple people is viewing.

In one or more embodiments, when multiple people are playing a video game that portions a display, a first person of the multiple people may view a portion of the display associated with a second person of the multiple people. For example, the first person may see or "peek" at what the second person is doing in the video and/or where the second person is in the video game. For instance, the first person may gain an unfair advantage over the second person if the first person is able to see or "peek" at what the second person is doing in the video and/or where the second person is in the video game. In one or more embodiments, each image portion of multiple image portions may be provided to each information handling system of multiple information handling systems respectively associated with multiple people (e.g., multiple video game players). In this fashion, a first person of the multiple people may not be able to see or "peek" at what the second person is doing in the video game and/or where the second person is in a video game.

In one or more embodiments, one or more systems, one or more methods, and/or one or more processes may determine a multiple screen layout of a video game and may determine which players are controlling what screens of the multiple screen layout. For example, one or more systems, one or more methods, and/or one or more processes may determine multiple portions of an image layout of the video game. For instance, the one or more systems, the one or more methods, and/or the one or more processes may determine that a first player of the video game is controlling a first portion of the multiple portions of the image layout of the video game and may determine that a second player of the video game is controlling a second portion of the multiple portions of the image layout of the video game. In one or more embodiments, after image portions and player associations are determined, image portions may be provided to appropriate players such that a first player may view first image portion associated with the first player and may not view second image portion associated with a second player.

In one or more embodiments, an image of a video (e.g., a video stream of a video game) may be divided into multiple portions. For example, the image may be subdivided by a configurable amount. For instance, average red, green and blue color values for each subdivision may be determined and may be stored with an associated timestamp. In one or more embodiments, when a user input event is detected (e.g., gamepad button press actuation, a joystick movement, etc.), stored average red, green and blue color values may be utilized to determine if a portion of the multiple portions of the image associated with a player has changed. For example, determining control of a portion of a video game image may be based at least on user input that caused a change to the portion of the video game image. For instance, if user input changed a view of a player, then the player may control that view.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a graphics processing unit (GPU) 130, a volatile memory medium 150, non-volatile memory media 160 and 170, an I/O subsystem 175, and a network interface 180. As illustrated, GPU 130, volatile memory medium 150, non-volatile memory media 160 and 170, I/O subsystem 175, and network interface 180 may be communicatively coupled to processor 120.

In one or more embodiments, one or more of GPU 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of GPU 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
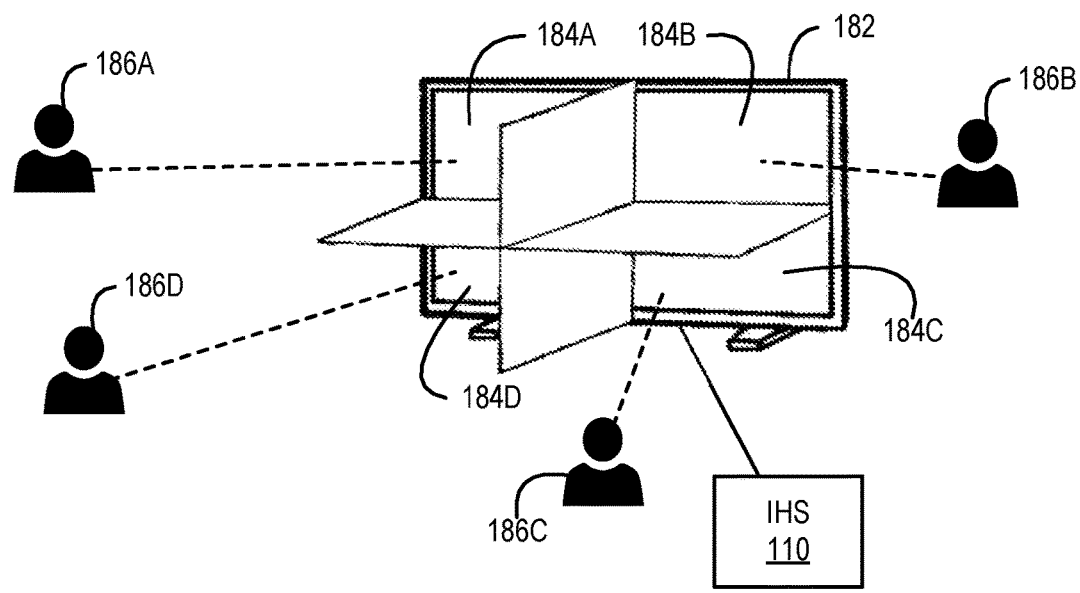
FIG. 1B illustrates an example of a display coupled to an information handling system, according to one or more embodiments.

Turning now to FIG. 1B, an example of a display coupled to an information handling system is illustrated, according to one or more embodiments. As shown, a display 182 may be coupled to IHS 110. In one or more embodiments, display 182 may be segmented into multiple display portions. For example, a multiplayer game split screen game may be displayed via the multiple display portions. For instance, APP 164 may include the multiplayer game split screen game. As illustrated, display 182 may be segmented into display portions 184A-184D. In one or more embodiments, a user 186 may be associated with a display portion 184. For example, display portions 184A-184D may be respectively associated with users 186A-186D. For instance, the multiplayer game split screen game may be displayed via display portions 184A-184D.

Figure 1C:
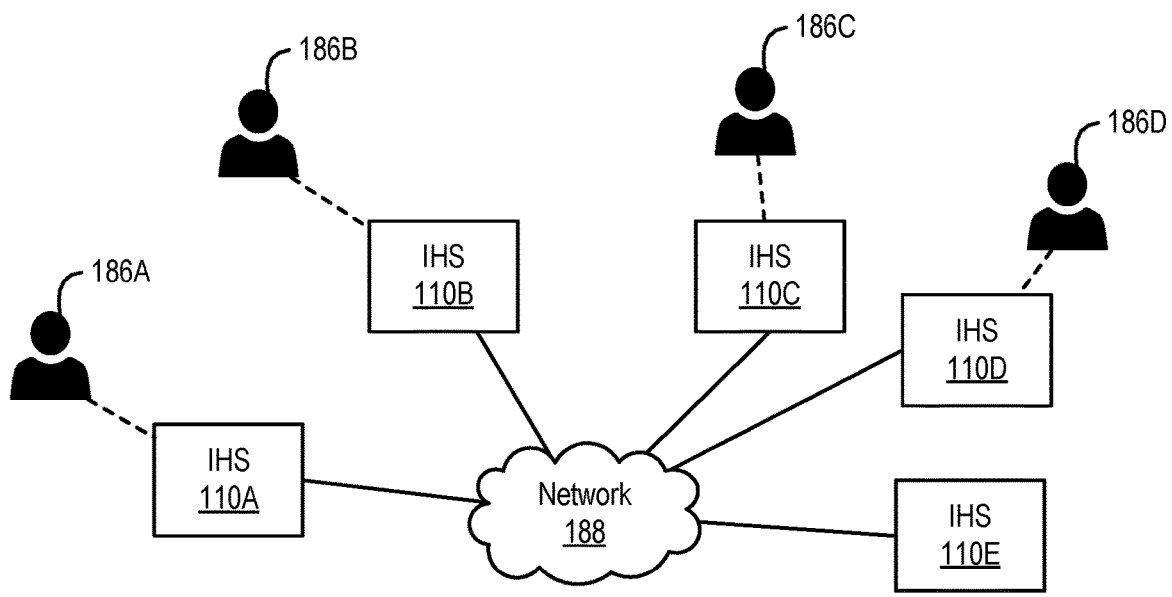
FIG. 1C illustrates an example of information handling systems coupled to a network, according to one or more embodiments.

Turning now to FIG. 1C, an example of information handling systems coupled to a network is illustrated, according to one or more embodiments. As shown, information handling systems (IHSs) 110A-110E may be coupled to a network 188. In one or more embodiments, network 188 may include a wired network, a wireless network, an optical network, or a combination of the foregoing, among others. For example, network 188 may include and/or be coupled to various types of communications networks. For instance, network 188 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

As illustrated, users 186A-186D may be respectively associated with IHSs 110A-110D. In one or more embodiments, IHS 110E may include a server information handling system (e.g., a gaming server). For example, users 186A-186D may play a game hosted by IHS 110E. For instance, users 186A-186D may play the game, hosted by IHS 110E, via respectively associated IHSs 110A-110D. In one or more embodiments, any of IHSs 110A-110D may include a server information handling system (e.g., a gaming server). For example, users 186A-186D may play a game hosted by any of IHSs 110A-110D. For instance, users 186A-186D may play the game, hosted by any of IHSs 110A-110D, via respectively associated IHSs 110A-110D.

Figure 1D:
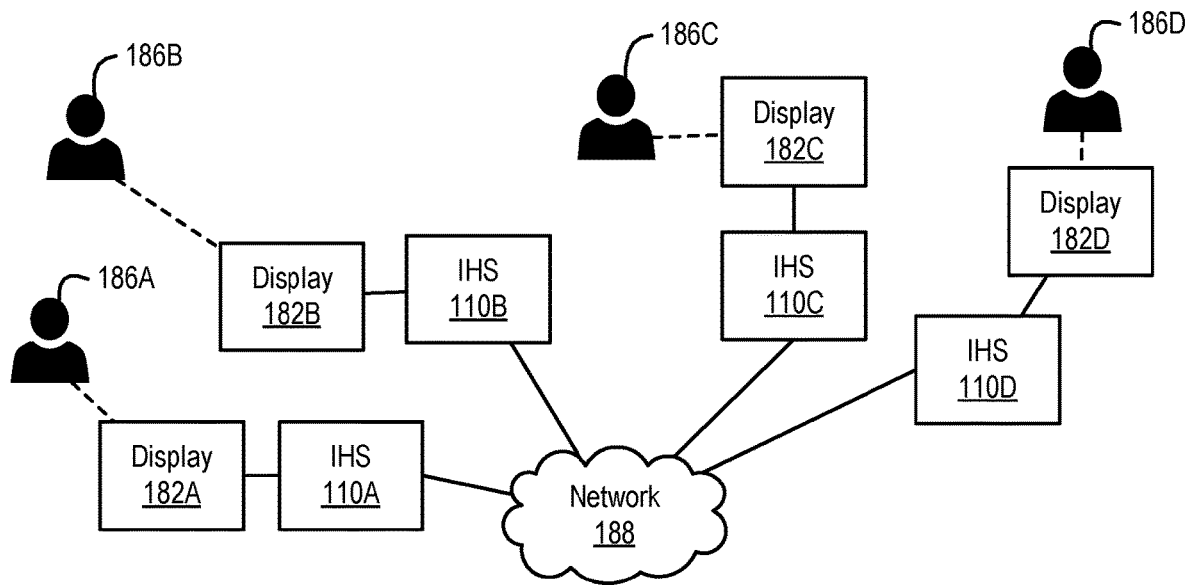
FIG. 1D illustrates an example of displays associated with information handling system, according to one or more embodiments.

Turning now to FIG. 1D, an example of displays associated with information handling system is illustrated, according to one or more embodiments. As shown, users 186A-186D may be respectively associated with displays 182A-182D. In one or more embodiments, displays 182A-182D may be respectively associated with IHSs 110A-110D. For example, displays 182A-182D may be respectively coupled to IHSs 110A-110D. Although displays 182A-182D are illustrated as external to IHSs 110A-110D, one or more of IHSs 110A-110D may respectively include one or more of displays 182A-182D.

Figure 1E:
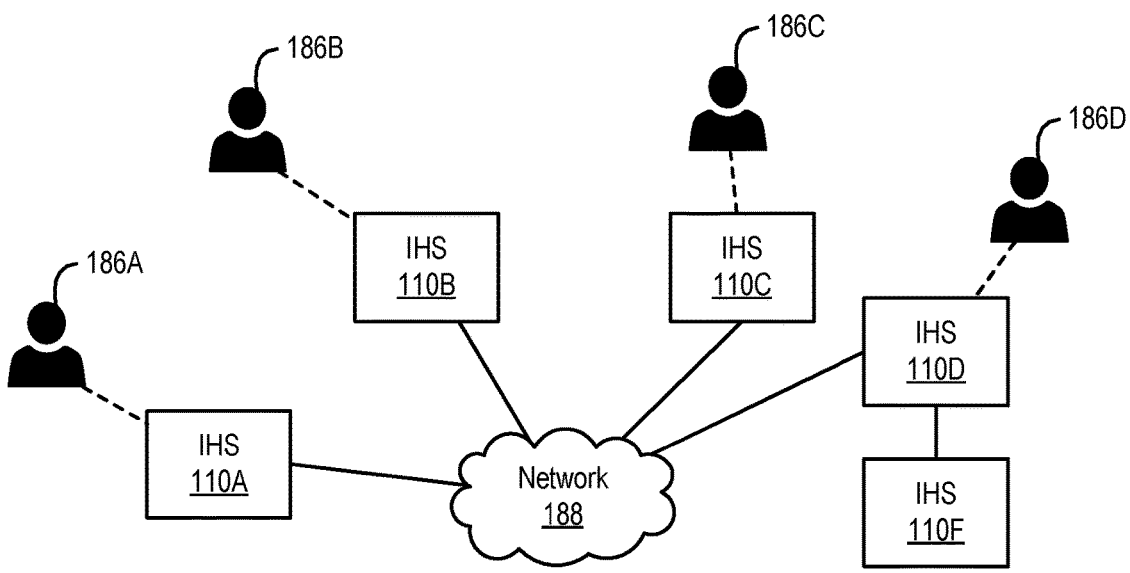
FIG. 1E illustrates an example of an information handling system coupled to another information handling system, according to one or more embodiments.

Turning now to FIG. 1E, an example of an information handling system coupled to another information handling system is illustrated, according to one or more embodiments. As shown, IHSs 110A-110D may be coupled to network 188. As illustrated, users 186A-186D may be respectively associated with IHSs 110A-110D. As shown, an IHS 110F may be coupled to IHS 1D. In one or more embodiments, IHS 110F may include a server information handling system (e.g., a gaming server). In one or more embodiments, IHS 110F may include a gaming console. In one example, IHS 110F may include a SONY® PLAYSTATION®. In a second example, IHS 110F may include a MICROSOFT® XBOX®. In another example, IHS 110F may include an APPLE® TV. In one or more embodiments, users 186A-186D may play a game hosted by IHS 110F. For example, users 186A-186D may play the game, hosted by IHS 110F, via respectively associated IHSs 110A-110D.

In one or more embodiments, IHS 110D may receive video from IHS 110F. For example, the video from IHS 110F may be segmented for multiple users (e.g., users 186A-186D). For instance, segmenting the video from IHS 110F may include sourcing display portions 184A-184D (shown in FIG. 1B) of the video from IHS 110F. In one or more embodiments, IHS 110D may convert display portions 184A-184D of the video from IHS 110F to multiple stream segments. For example, IHS 110D may stream display portions 184A-184D to users 186A-186D via respectively associated IHSs 110A-110D. In one or more embodiments, IHS 110D may receive respective user input from users 186A-186D via respectively associated IHSs 110A-110D. For example, IHS 110D may provide the respective user input from users 186A-186D via respectively associated IHSs 110A-110D to IHS 110F. In one or more embodiments, IHS 110D may associate user input from users 186A-186D via respectively associated IHSs 110A-110D with display portions 184A-184D of the video from IHS 110F.

Figure 2:
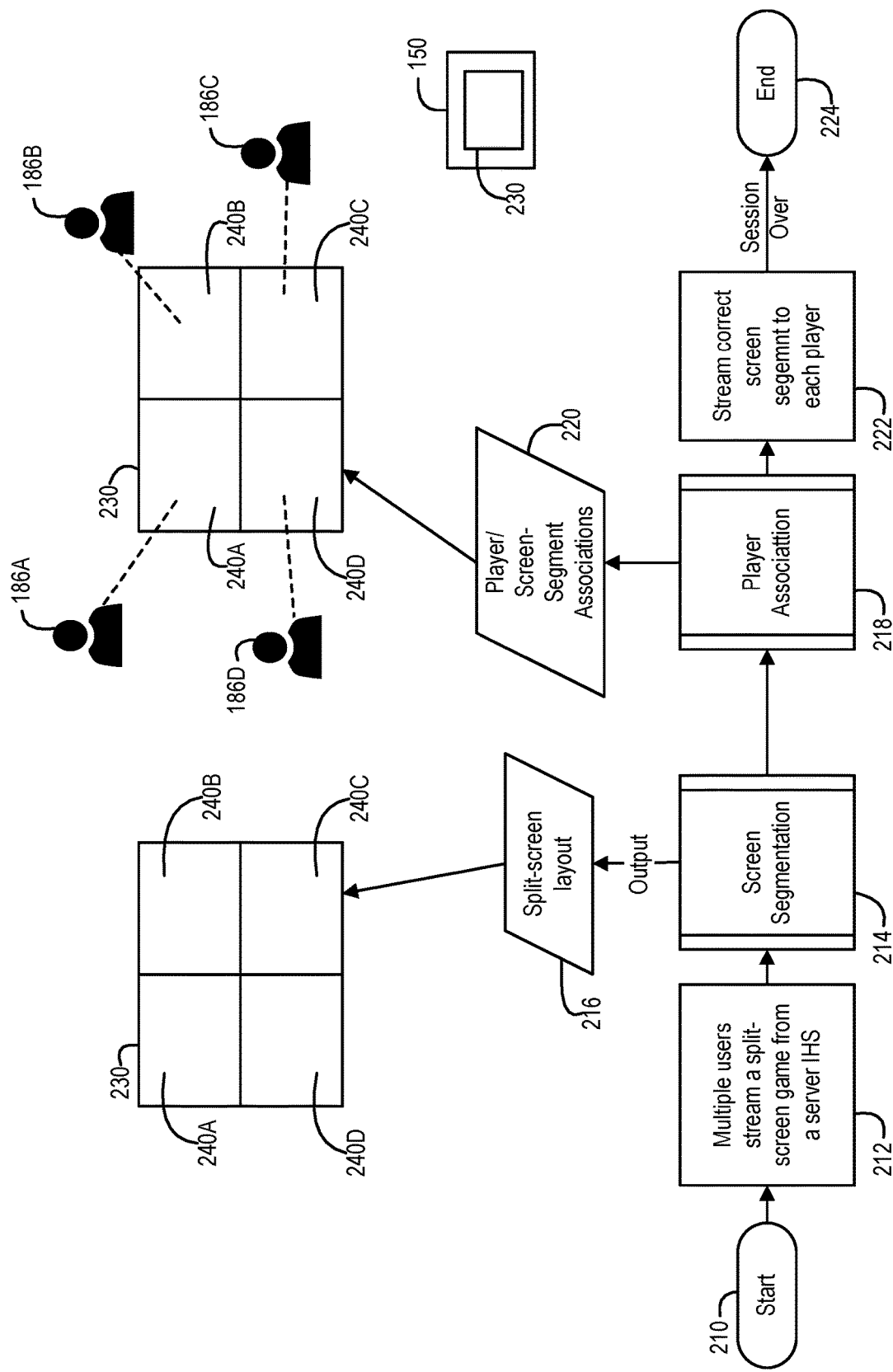
FIG. 2 illustrates an example of a method of splitting a screen layout, according to one or more embodiments.

Turning now to FIG. 2, an example of a method of splitting a screen layout is illustrated, according to one or more embodiments. At 210, the method may start. At 212, multiple users may stream a split-screen game from a server IHS (e.g., a game server). For example, users 186A-186D may stream a split-screen game from the server IHS. In one instance, IHSs 110A-110D respectively associated with users 186A-186D may stream a split-screen game from the server IHS. In a second instance, the server IHS may be IHS 110E. In third instance, the server IHS may be any of IHSs 110A-110D. In another instance, the server IHS may be IHS 110F.

At 214, a screen may be segmented. At 216, a split-screen layout may be determined. In one or more embodiments, an image 230 associated with the game may be split into segments 240A-240D. For example, volatile memory medium 150 of the server IHS may store image 230. For instance, image 230 may be rendered in volatile memory medium 150 of the server IHS. In one or more embodiments, a stream of image frames of the game may include image 230.

At 218, player association may be utilized. At 220, associations between each player and each screen segment may be determined. In one example, the server IHS may determine that segments 240A-240D are respectively associated with users 186A-186D. For instance, the server IHS may determine that segments 240A-240D are respectively associated with IHSs 110A-110D. In another example, IHS 110D may receive image 230 from IHS 110F and may determine that segments 240A-240D are respectively associated with users 186A-186D. For instance, IHS 110D may determine that segments 240A-240D are respectively associated with IHSs 110A-110D.

At 222, a correct screen segment may be streamed to each player. In one example, screen segment 240A may be streamed to user 186A. For instance, screen segment 240A may be streamed to IHS 110A. In a second example, screen segment 240B may be streamed to user 186B. For instance, screen segment 240B may be streamed to IHS 110B. In a third example, screen segment 240C may be streamed to user 186C. For instance, screen segment 240C may be streamed to IHS 110C. In another example, screen segment 240D may be streamed to user 186D. For instance, screen segment 240D may be streamed to IHS 110D.

In one or more embodiments, streaming a specific screen segment 240 may include providing the specific screen segment 240 to a specific IHS 110 via network 188. For example, the specific IHS 110 may receive the specific screen segment 240 via network 188. In one instance, if IHS 110A is the specific IHS 110, then the specific screen segment 240 may be provided to IHS 110A via network 188. In another instance, if IHS 110A is the specific IHS 110, then the specific screen segment 240 may not be provided to any of IHSs 110B-110D via network 188. In one or more embodiments, segments 240A-240D may be displayed via respective displays 182A-182D. In one example, user 186A may view screen segment 240A and may not view any of screen segments 240B-240D. In a second example, user 186B may view screen segment 240B and may not view any of screen segments 240A, 240C, and 240D. In a third example, user 186C may view screen segment 240C and may not view any of screen segments 240A, 240B, and 240D. In another example, user 186D may view screen segment 240D and may not view any of screen segments 240A-240C. At 224, the method may end. For example, the method may end when a session is over (e.g., when a gaming session is over).

Figure 3:
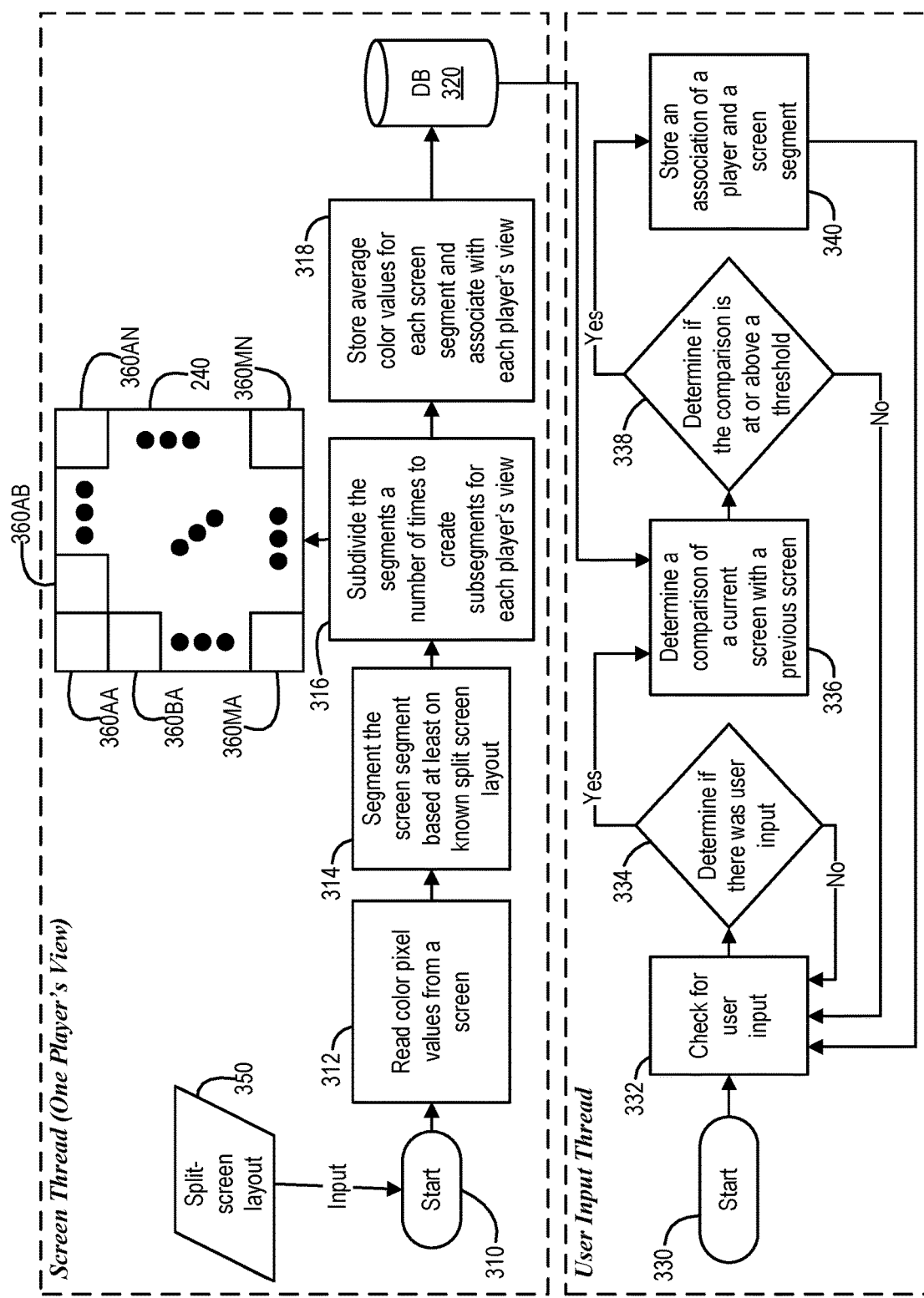
FIG. 3 illustrates two methods of segmenting a screen, according to one or more embodiments.

Turning now to FIG. 3, two methods of segmenting a screen are illustrated, according to one or more embodiments. At 310, a first method may start. In one or more embodiments, the first method may include method elements 310-318. For example, the first method may be implemented via a first thread. For instance, the first thread may include a screen thread, which may be associated with one player's view (e.g., a single player's view). In one or more embodiments, a second method may include method elements 330-340. For example, the second method may be implemented via a second thread. For instance, the second thread may include a user input thread. In one or more embodiments, method element 216 (illustrated in FIG. 2) may include method elements 310-318 and method elements 330-340, among others. In one or more embodiments, when the first method starts, a split-screen layout 350 may be received as input.

At 312, color pixel values from a screen segment may be read. For example, color pixel values from a screen segment 240 may be read. In one instance, a color pixel value from a screen segment may include a red color value, a green color value, and a blue color value of a pixel (e.g., RGB color values of a pixel). In a second instance, a color pixel value from a screen segment may include a cyan color value, a magenta color value, a yellow color value, and a key color value of a pixel (e.g., CMYK color values of a pixel). In a third instance, a color pixel value from a screen segment may include a hue color value, a saturation color value, and a value color value of a pixel (e.g., HSV color values of a pixel). In another instance, a color pixel value from a screen segment may include a hue color value, a saturation color value, and a lightness color value of a pixel (e.g., HSL color values of a pixel).

At 314, the screen segment may be segmented based at least on a known split screen layout. At 316, the screen segments may be subsegmented a number of times to create subsegments for each player's view. For example, a screen segment 240 associated with a user 186 may be subsegmented a number of times to create subsegments. For instance, screen segment 240 may be subsegmented into subsegments 360AA-360MN.

At 318, average color values for each screen segment may be stored and may be associated with each player's view. For example, average color values for respective subsegments 360AA-360MN may be determined. In one or more embodiments, an average color value of a screen segment may be a vector. For example, in determining an average color value of red values, green values, and blue values, the vector may include an average red value, an average green value, and an average blue value. In one or more embodiments, an average color value of a screen segment may be a scalar. For example, in determining an average color value of red values, green values, and blue values, the scalar may be determined via adding all the red values, green values, and blue values and dividing that sum by a sum of a number of red values, a number of green values, and a number of blue values.

In one or more embodiments, average color values of pixels respectively associated with associated with subsegments 360AA-360MN may be stored. For example, the average color values of pixels respectively associated with associated with subsegments 360AA-360MN may be stored via a database (DB) 320. In one or more embodiments, the first method (e.g., the screen thread) may proceed to 312.

At 330, the second method may start. For example, the user input thread may start. In one or more embodiments, the screen thread and the user input thread may execute independently. For example, the screen thread and the user input thread may execute independently of each other.

At 332, a check for user input may be performed. In one example, user input may include an actuation of a key of a keyboard. In a second example, user input may include a movement of a mouse. In a third example, user input may include a touch and/or swipe on a touchpad. In a fourth example, user input may include a movement of a joystick. In a fifth example, user input may include a movement of a trackball. In a sixth example, user input may include an actuation of a switch (e.g., a momentary switch) of a mouse, a touchpad, a game pad, a joystick, and/or a trackball, among others. In a seventh example, user input may include a gesture. In an eighth example, user input may include a tap (e.g., determined via an accelerometer). In another example, user input may include a rotation of an input device (e.g., a device that includes one or more of an accelerometer and a gyroscope, among others). In one or more embodiments, user input may be determined from any device configured to receive user input. In one example, a device configured to receive user input may include a firearm replica. In another example, a device configured to receive user input may include a flight simulator device. In one instance, a flight simulator device may include a flight simulator yoke. In a second instance, a flight simulator device may include a flight simulator throttle. In another instance, a flight simulator device may include a flight simulator switch panel.

At 334, it may be determined if there was user input. If there was not user input, the second method may proceed to 332, according to one or more embodiments. If there was user input, a comparison of a current screen with a previous screen may be determined, at 336. In one or more embodiments, determining a comparison of a current screen with a previous screen may include determining a comparison of a current image of screen segment 240 at a current time with a previous image of screen segment 240 at a previous time. For example, determining the comparison of the current image of screen segment 240 at the current time with the previous image of screen segment 240 at the previous time may include determining comparisons of average color values associated with subsegments 360AA-360MN of the current image of screen segment 240 with average color values associated with subsegments 360AA-360MN of the previous image of screen segment 240.

In one or more embodiments, determining comparisons of average color values associated with subsegments 360AA-360MN of the current image of screen segment 240 with average color values associated with subsegments 360AA-360MN of the previous image of screen segment 240 may include determining how many of the average color values associated with subsegments 360AA-360MN of the current image of screen segment 240 differ from average color values associated with subsegments 360AA-360MN of the previous image of screen segment 240. In one or more embodiments, determining comparisons of average color values associated with sub segments 360AA-360MN of the current image of screen segment 240 with average color values associated with subsegments 360AA-360MN of the previous image of screen segment 240 may include determining how much of the average color values associated with subsegments 360AA-360MN of the current image of screen segment 240 differ from average color values associated with subsegments 360AA-360MN of the previous image of screen segment 240. In one or more embodiments, determining comparisons of average color values associated with subsegments 360AA-360MN of the current image of screen segment 240 with average color values associated with subsegments 360AA-360MN of the previous image of screen segment 240 may include determining how many of the average color values associated with subsegments 360AA-360MN of the current image of screen segment 240 differ from average color values associated with subsegments 360AA-360MN of the previous image of screen segment 240 and how much of the average color values associated with subsegments 360AA-360MN of the current image of screen segment 240 differ from average color values associated with subsegments 360AA-360MN of the previous image of screen segment 240.

At 338, it may be determined if the comparison is at or above a threshold. For example, determining if the comparison is at or above the threshold may include determining if a number of the average color values associated with subsegments 360AA-360MN of the current image of screen segment 240 that differs from average color values associated with subsegments 360AA-360MN of the previous image of screen segment 240 is at or above a threshold number.

If the comparison is not at or above a threshold, the second method may proceed to 332, according to one or more embodiments. If the comparison is at or above a threshold, an association of a player (e.g., a user 186) and a screen segment (e.g., a screen segment 240) may be stored. For example, the association of the player and the screen segment may be stored via a memory medium. In one instance, an association of user 186A and screen segment 240A may be stored via a memory medium. In a second instance, an association of user 186B and screen segment 240B may be stored via a memory medium. In a third instance, an association of user 186C and screen segment 240C may be stored via a memory medium. In another instance, an association of user 186D and screen segment 240D may be stored via a memory medium. In one or more embodiments, the second method may proceed to 332.

Figure 4:
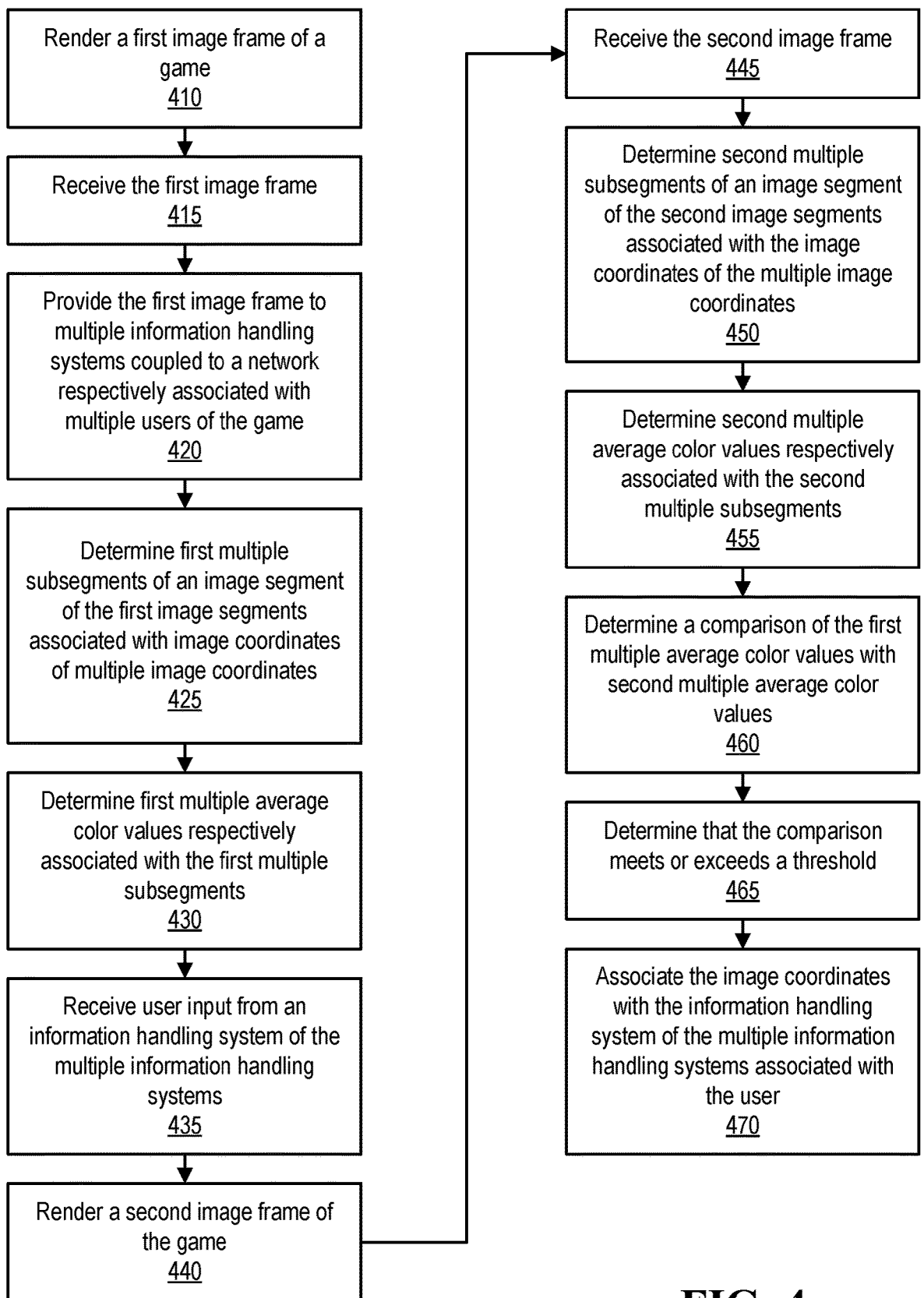
FIG. 4 illustrates an example of a method of utilizing a multiplayer game with multiple displays respectively associated with multiple information handling systems, according to one or more embodiments.

Turning now to FIG. 4, an example of a method of utilizing a multiplayer game with multiple displays respectively associated with multiple information handling systems is illustrated, according to one or more embodiments. At 410, a first image frame of a game may be rendered. In one example, at least one of processor 120 and GPU 130 may render may render the first image frame. For instance, at least one of processor 120 and GPU 130 of a server information handling system may render may render the first image frame. In another example, a gaming console may render the first image frame. For instance, at least one of processor 120 and GPU 130 of a gaming console (e.g., IHS 110F) may render the first image frame.

Figure 5A:
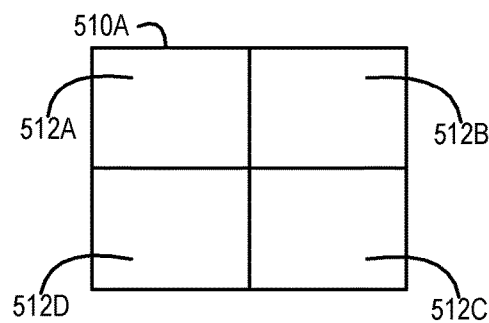
FIG. 5A illustrates an example of a first image frame that includes multiple first image segments, according to one or more embodiments.
Figure 5B:
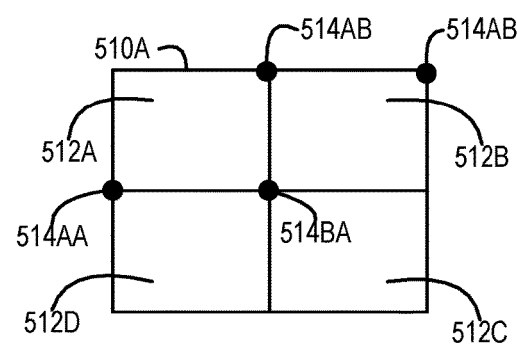
FIG. 5B illustrates an example of a first image segment associated with coordinates, according to one or more embodiments.

In one or more embodiments, the first image frame may include multiple first image segments respectively associated with multiple image coordinates. For example, the first image frame may be an image frame 510A, illustrated in FIGS. 5A-5C. In one or more embodiments, a stream image frames of the game may include the first image frame. As illustrated in FIG. 5A, image frame 510A may include multiple first image segments 512A-512D. As shown in FIG. 5B, first image segment 512A may be associated with coordinates 514AA and 514AB. For example, first image segment 512A may be determined via lower left coordinates 514AA and upper right coordinates 514AB. As also shown in FIG. 5B, first image segment 512B may be associated with coordinates 514BA and 514BB. For example, first image segment 512B may be determined via lower left coordinates 514BA and upper right coordinates 514BB.

In one or more embodiments, a first coordinate of coordinates 514 may be associated with a horizontal axis, and a second coordinate of coordinates 514 may be associated with a vertical axis. For example, coordinates 514 may include a form (X, Y). In one or more embodiments, an image segment may be determined via $(X_{Lower\ Left}, Y_{Lower\ Left})$ and $(X_{Upper\ Right}, Y_{Upper\ Right})$. In one or more embodiments, an image segment may be determined via $(X_{Lower\ Left}, Y_{Lower\ Left})$ and $(X_{Lower\ Left}+X_{Offset}, Y_{Lower\ Left}+Y_{Offset})$. In one or more embodiments, one or more other segment shapes and/or one or more other coordinate systems may be utilized.

Figure 5C:
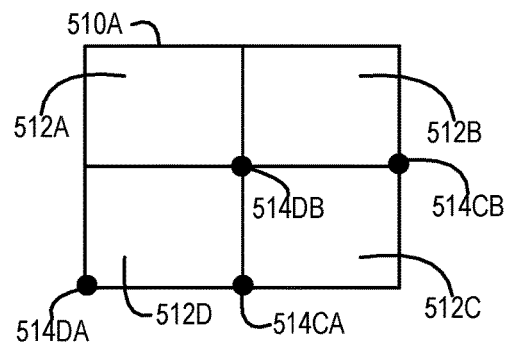
FIG. 5C illustrates an example of another first image segment associated with coordinates, according to one or more embodiments.

As illustrated in FIG. 5C, first image segment 512C may be associated with coordinates 514CA and 514CB. For example, first image segment 512C may be determined via lower left coordinates 514CA and upper right coordinates 514CB. As also illustrated in FIG. 5C, first image segment 512D may be associated with coordinates 514DA and 514DB. For example, first image segment 512D may be determined via lower left coordinates 514DA and upper right coordinates 514DB.

Referring again to FIG. 4, at 415, the first image frame may be received. In one example, memory medium 150 may receive the first image frame. In another example, an information handling system may receive the first image frame from a gaming console. For instance, IHS 110D may receive the first image from IHS 110F (e.g., a gaming console). In one or more embodiments, IHS 110D may receive the first image from IHS 110F (e.g., the gaming console) via at least one of a high-definition multimedia interface (HDMI), a digital visual interface (DVI), a DisplayPort interface, a video graphics array (VGA) interface, and a USB interface, among others.

At 420, the first image frame may be provided to multiple information handling systems coupled to a network respectively associated with multiple users of the game. For example, image frame 510A may be provided IHSs 110A-110D, coupled to network 188, respectively associated with multiple users 186A-186D of the game.

Figure 5D:
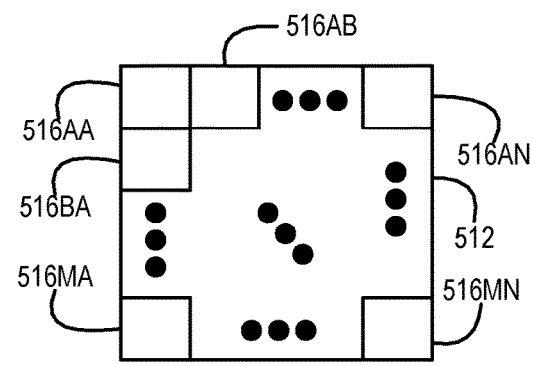
FIG. 5D illustrates an example of determining first multiple subsegments of an image segment of first image segments associated with image coordinates of multiple image coordinates, according to one or more embodiments.

At 425, first multiple subsegments of an image segment of the first image segments associated with image coordinates of multiple image coordinates may be determined. For example, as illustrated in FIG. 5D, first multiple subsegments 516AA-516MN of an image segment 512 of the first image segments 512A-512D associated image coordinates of multiple image coordinates 514AA-514DB may be determined.

At 430, first multiple average color values respectively associated with the first multiple subsegments may be determined. For example, first multiple average color values respectively associated with first multiple subsegments 516AA-516MN may be determined. For instance, an average color value of the first multiple average color values may include an average color value of pixels of a subsegment 516. As an example, $(Red_{average}, Green_{average}, Blue_{average})$ of the first multiple average color values may be determined as an average color value of pixels of a subsegment 516. For instance, an average color value of the first multiple average color values may include a tuple or vector $(Red_{average}, Green_{average}, Blue_{average})$.

At 435, user input from an information handling system of the multiple information handling systems may be received. For example, user input from an information handling system of information handling systems 110A-110D may be received. For instance, the user input may be received by the information handling system server (e.g., one of IHSs 110A-110E). In one or more embodiments, the user input may be provided to the gaming console. For example, the user input may be received by the gaming console. For instance, the user input may be received by IHS 110D, provided to IHS 110F, and/or received by IHS 110F (e.g., the gaming console).

At 440, a second image frame of the game may be rendered. In one example, at least one of processor 120 and GPU 130 may render may render the second image frame. For instance, at least one of processor 120 and GPU 130 of the server information handling system may render may render the second image frame. In another example, the gaming console may render the second image frame. For instance, at least one of processor 120 and GPU 130 of the gaming console (e.g., IHS 110F) may render the second image frame. In one or more embodiments, the second image frame of the game may be based at least on the user input. For example, the second image frame of the game may be rendered based at least on the user input. In one or more embodiments, the second image frame may include multiple second image segments respectively associated with the multiple image coordinates.

Figure 5E:
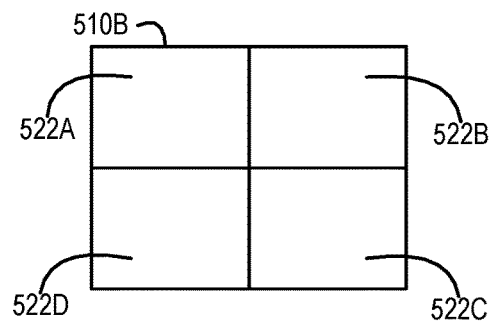
FIG. 5E illustrates an example of a second image frame that includes multiple second image segments, according to one or more embodiments.

In one or more embodiments, the second image frame may include multiple second image segments respectively associated with the multiple image coordinates. For example, the second image frame may be an image frame 510B, illustrated in FIGS. 5E-5G. In one or more embodiments, the stream image frames of the game may include the second image frame. As illustrated in FIG. 5E, image frame 510B may include multiple second image segments 522A-

Figure 5F:
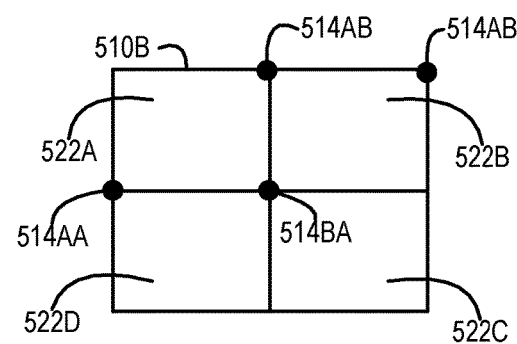
FIG. 5F illustrates an example of a second image segment associated with coordinates, according to one or more embodiments.
Figure 5G:
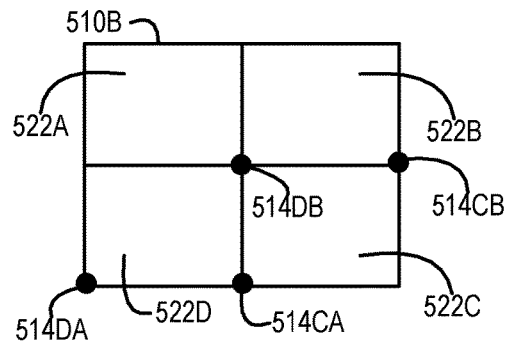
FIG. 5G illustrates an example of another second image segment associated with coordinates, according to one or more embodiments.

522D. As shown in FIG. 5F, second image segment 522A may be associated with coordinates 514AA and 514AB. For example, second image segment 522A may be determined via lower left coordinates 514AA and upper right coordinates 514AB. As also shown in FIG. 5B, second image segment 522B may be associated with coordinates 514BA and 514BB. For example, second image segment 522B may be determined via lower left coordinates 514BA and upper right coordinates 514BB. As illustrated in FIG. 5G, second image segment 522C may be associated with coordinates 514CA and 514CB. For example, second image segment 522C may be determined via lower left coordinates 514CA and upper right coordinates 514CB. As also illustrated in FIG. 5G, second image segment 522D may be associated with coordinates 524DA and 514DB. For example, second image segment 512D may be determined via lower left coordinates 514DA and upper right coordinates 514DB.

Referring again to FIG. 4, at 445, the second image frame may be received. In one example, memory medium 150 may receive the second image frame. In another example, an information handling system may receive the second image from the gaming console. For instance, IHS 110D may receive the second image from IHS 110F (e.g., the gaming console).

Figure 5H:
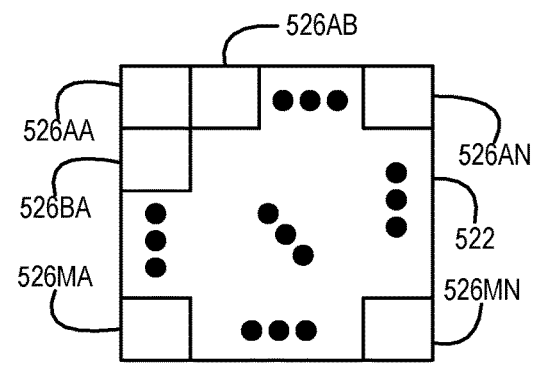
FIG. 5H illustrates an example of determining second multiple subsegments of an image segment of second image segments associated with image coordinates of multiple image coordinates, according to one or more embodiments.

At 450, second multiple subsegments of an image segment of the second image segments associated with the image coordinates of the multiple image coordinates may be determined. For example, second multiple subsegments 526AA-526MN of an image segment 522 of the second image segments 522A-522D associated image coordinates of multiple image coordinates 514AA-514DB may be determined, as illustrated in FIG. 5H.

At 455, second multiple average color values respectively associated with the second multiple subsegments may be determined. For example, second multiple average color values respectively associated with second multiple subsegments 526AA-526MN may be determined. For instance, an average color value of the second multiple average color values may include an average color value of pixels of a subsegment 526. As an example, (Red$_{average}$, Green$_{average}$, Blue$_{average}$) of the second multiple average color values may be determined as an average color value of pixels of a subsegment 526. For instance, an average color value of the second multiple average color values may include a tuple or vector (Red$_{average}$, Green$_{average}$, Blue$_{average}$).

At 460, a comparison of the first multiple average color values with second multiple average color values may be determined. At 465, it may be determined that the comparison meets or exceeds a threshold. At 470, the image coordinates may be associated with the information handling system of the multiple information handling systems associated with the user. For example, a segment associated with the image coordinates of additional image frames of the stream image frames of the game may be provided to the information handling system of the multiple information handling systems associated with the user. For instance, the segment associated with the image coordinates of additional image frames of the stream image frames of the game may be provided to the information handling system of the multiple information handling systems associated with the user and may not be provided to other users of the multiple users. In one or more embodiments, associating the image coordinates with the information handling system of the multiple information handling systems associated with the user may be performed in response to determining that the comparison meets or exceeds the threshold.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
receive a first image frame of a game, wherein the first image frame includes a plurality of first image segments respectively associated with a plurality of image coordinates;
provide the first image frame to each of a plurality of information handling systems coupled to a network respectively associated with a plurality of users of the game;
determine a first plurality of subsegments of an image segment of the first image segments associated with particular image coordinates of the plurality of image coordinates;
determine a first plurality of average color values respectively associated with the first plurality of subsegments;
receive user input from a particular information handling system of the plurality of information handling systems;
receive a second image frame of the game, wherein the second image frame is based at least on the user input and wherein the second image frame includes a plurality of second image segments respectively associated with the plurality of image coordinates;
determine a second plurality of subsegments of an image segment of the second image segments associated with the particular image coordinates of the plurality of image coordinates;
determine a second plurality of average color values respectively associated with the second plurality of subsegments;

determine a comparison of the first plurality of average color values with second plurality of average color values;

determine that the comparison meets or exceeds a threshold; and in response to determining that the comparison meets or exceeds the threshold, associate the particular image coordinates with the particular information handling system of the plurality of information handling systems associated with the user input, and providing only frame segments of additional image frames of the game associated with the particular image coordinates to the particular information handling system, and excluding frame segments of the additional image frames of the game associated with other image coordinates to the particular information handling system.

2. The information handling system of claim 1, wherein, to receive the first image frame, the instructions further cause the information handling system to receive the first image frame from at least one of a processor of a server information handling system and a graphics processing unit of the server information handling system; and wherein, to receive the second image frame, the instructions further cause the particular information handling system to, receive the second image frame from the at least one of the processor of the server information handling system and the graphics processing unit of the server information handling system.

3. The information handling system of claim 2, wherein the instructions further cause the information handling system to:

wherein the at least one of the processor of the server information handling system and the graphics processing unit of the server information handling system is configured to render the first image frame; and wherein the at least one of the processor of the server information handling system and the graphics processing unit of the server information handling system is further configured to render the second image frame.

4. The information handling system of claim 2, wherein the plurality of information handling systems includes the server information handling system.

5. The information handling system of claim 1, wherein, to receive the first image frame, the instructions further cause the particular information handling system to receive the first image frame from a gaming console; and wherein, to receive the second image frame, the instructions further cause the particular information handling system to receive the second image frame from the gaming console.

6. The information handling system of claim 5, wherein, to receive the first image frame from the gaming console, the instructions further cause the particular information handling system to receive the first image frame from the gaming console via a video interface; and wherein, to receive the second image frame from the gaming console, the instructions further cause the particular information handling system to receive the second image frame from the gaming console via the video interface.

7. The information handling system of claim 6, wherein the video interface includes at least one of a high-definition multimedia interface (HDMI), a digital visual interface (DVI), a DisplayPort interface, a video graphics array (VGA) interface, and a universal serial bus (USB) interface.

8. A method, comprising:

receiving a first image frame of a game, wherein the first image frame includes a plurality of first image segments respectively associated with a plurality of image coordinates;

providing the first image frame to each of a plurality of information handling systems coupled to a network respectively associated with a plurality of users of the game;

determining a first plurality of subsegments of an image segment of the first image segments associated with particular image coordinates of a plurality of image coordinates;

determining a first plurality of average color values respectively associated with the first plurality of subsegments;

receiving user input from a particular information handling system of the plurality of information handling systems;

receiving a second image frame of the game based at least on the user input, wherein the second image frame is based at least on the user input and wherein the second image frame includes a plurality of second image segments respectively associated with the plurality of image coordinates;

determining a second plurality of subsegments of an image segment of the second image segments associated with the particular image coordinates of the plurality of image coordinates;

determining a second plurality of average color values respectively associated with the second plurality of subsegments;

determining a comparison of the first plurality of average color values with second plurality of average color values;

determining that the comparison meets or exceeds a threshold; and in response to the determining that the comparison meets or exceeds the threshold, associating the particular image coordinates with the particular information handling system associated with the user input, and providing only frame segments of additional image frames of the game associated with the particular image coordinates to the particular information handling system, and excluding frame segments of the additional image frames of the game associated with other image coordinates to the particular information handling system.

9. The method of claim 8, wherein the receiving the first image frame includes receiving the first image frame from at least one of a processor of a server information handling system and a graphics processing unit of the server information handling system; and wherein the receiving the second image frame includes receiving the second image frame from the at least one of the processor of the server information handling system and the graphics processing unit of the server information handling system.

10. The method of claim 9, further comprising:

rendering, by the at least one of the processor of the server information handling system and the graphics processing unit of the server information handling system, the first image frame; and rendering, by the at least one of the processor of the server information handling system and the graphics processing unit of the server information handling system, the second image frame.

11. The method of claim 9, wherein the plurality of information handling systems includes the server information handling system.

12. The method of claim 8,
wherein the receiving the first image frame includes receiving the first image frame from a gaming console; and
wherein the receiving the second image frame includes receiving the second image frame from the gaming console.

13. The method of claim 12,
wherein the receiving the first image frame from the gaming console includes receiving the first image frame from the gaming console via a video interface; and
wherein the receiving the second image frame from the gaming console includes receiving the second image frame from the gaming console via the video interface.

14. The method of claim 13, wherein the video interface includes at least one of a high-definition multimedia interface (HDMI), a digital visual interface (DVI), a DisplayPort interface, a video graphics array (VGA) interface, and a universal serial bus (USB) interface.

15. A computer-readable non-transitory memory medium that includes instructions that, when executed by at least one processor of an information handling system, cause the information handling system to:
receive a first image frame of a game, wherein the first image frame includes a plurality of first image segments respectively associated with a plurality of image coordinates;
provide the first image frame to each of a plurality of information handling systems coupled to a network respectively associated with a plurality of users of the game;
determine a first plurality of subsegments of an image segment of the first image segments associated with particular image coordinates of the plurality of image coordinates;
determine a first plurality of average color values respectively associated with the first plurality of subsegments;
receive user input from a particular information handling system of the plurality of information handling systems;
receive a second image frame of the game, wherein the second image frame is based at least on the user input and wherein the second image frame includes a plurality of second image segments respectively associated with the plurality of image coordinates;
determine a second plurality of subsegments of an image segment of the second image segments associated with the particular image coordinates of the plurality of image coordinates;
determine a second plurality of average color values respectively associated with the second plurality of subsegments;

determine a comparison of the first plurality of average color values with second plurality of average color values;
determine that the comparison meets or exceeds a threshold; and
in response to determining that the comparison meets or exceeds the threshold, associate the particular image coordinates with the particular information handling system of the plurality of information handling systems associated with the user input, and providing only frame segments of additional image frames of the game associated with the particular image coordinates to the particular information handling system, and excluding frame segments of the additional image frames of the game associated with other image coordinates to the particular information handling system.

16. The information handling system of claim 15,
wherein, to receive the first image frame, the instructions further cause the information handling system to receive the first image frame from at least one of a processor of a server information handling system and a graphics processing unit of the server information handling system; and
wherein, to receive the second image frame, the instructions further cause the particular information handling system to, receive the second image frame from the at least one of the processor of the server information handling system and the graphics processing unit of the server information handling system.

17. The information handling system of claim 16, wherein the plurality of information handling systems includes the server information handling system.

18. The information handling system of claim 15,
wherein, to receive the first image frame, the instructions further cause the particular information handling system to receive the first image frame from a gaming console; and
wherein, to receive the second image frame, the instructions further cause the particular information handling system to receive the second image frame from the gaming console.

19. The information handling system of claim 18,
wherein, to receive the first image frame from the gaming console, the instructions further cause the particular information handling system to receive the first image frame from the gaming console via a video interface; and
wherein, to receive the second image frame from the gaming console, the instructions further cause the particular information handling system to receive the second image frame from the gaming console via the video interface.

20. The information handling system of claim 19, wherein the video interface includes at least one of a high-definition multimedia interface (HDMI), a digital visual interface (DVI), a DisplayPort interface, a video graphics array (VGA) interface, and a universal serial bus (USB) interface.

* * * * *